United States Patent
Hirai et al.

(10) Patent No.: US 8,502,405 B2
(45) Date of Patent: Aug. 6, 2013

(54) WIND TURBINE FOR WIND POWER GENERATION

(75) Inventors: Shigeto Hirai, Tokyo (JP); Yasushi Okano, Tokyo (JP); Shinsuke Sato, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 399 days.

(21) Appl. No.: 13/000,642

(22) PCT Filed: Aug. 23, 2010

(86) PCT No.: PCT/JP2010/064184
§ 371 (c)(1),
(2), (4) Date: Dec. 22, 2010

(87) PCT Pub. No.: WO2011/024760
PCT Pub. Date: Mar. 3, 2011

(65) Prior Publication Data
US 2011/0163545 A1  Jul. 7, 2011

(30) Foreign Application Priority Data
Aug. 28, 2009  (JP) ................................. 2009-198262

(51) Int. Cl.
*F03D 9/00* (2006.01)
*H02P 9/04* (2006.01)
*H05K 7/20* (2006.01)

(52) U.S. Cl.
USPC ................................ 290/44; 290/55; 361/696

(58) Field of Classification Search
USPC ...................................... 290/44, 55; 361/696
See application file for complete search history.

(56) References Cited

U.S. PATENT DOCUMENTS
4,706,739 A * 11/1987 Noren ....................... 165/104.14
(Continued)

FOREIGN PATENT DOCUMENTS
JP          61-31841 A       2/1986
JP           5-79450 A       3/1993
(Continued)

OTHER PUBLICATIONS
International Search Report of corresponding application No. PCT/JP2010/064184 mailed Nov. 16, 2010.

*Primary Examiner* — Pedro J Cuevas
(74) *Attorney, Agent, or Firm* — Kanesaka Berner & Partners, LLP

(57) ABSTRACT

A wind turbine for wind power generation accommodated a heat-generating device therein is always properly cooled by accurately detecting clogging of a filter. A wind turbine accommodates a heat-generating device and includes a column disposed in an upright position on a foundation, a nacelle disposed on a top end of the column, and a rotor head supported by the nacelle so as to be rotatable about a substantially horizontal axis, and the wind turbine includes an intake which is provided in an outer surface of the wind turbine and through which outside air is taken into the wind turbine to cool the heat-generating device; an exhaust which is provided in the outer surface of the wind turbine and through which air inside the wind turbine is discharged outside the wind turbine; an impurity-removing mechanism disposed in a flow path of air from the intake to the exhaust to remove impurities contained in the outside air; and a control unit for determining the condition of the impurity-removing mechanism by comparing, as a parameter serving as a criterion for determining the condition of the impurity-removing mechanism, latest data obtained while a wind speed outside the wind turbine is substantially stable with reference value data input in advance and serving as a reference.

10 Claims, 5 Drawing Sheets

U.S. PATENT DOCUMENTS

| | | | |
|---|---|---|---|
| 6,470,740 B2 * | 10/2002 | Li | 73/147 |
| 6,676,122 B1 * | 1/2004 | Wobben | 290/55 |
| 6,742,583 B2 * | 6/2004 | Tikka | 165/291 |
| 6,775,137 B2 * | 8/2004 | Chu et al. | 361/696 |
| 7,254,022 B2 * | 8/2007 | Ebermann | 361/696 |
| 7,312,993 B2 * | 12/2007 | Bundza et al. | 361/696 |
| 7,883,313 B2 * | 2/2011 | Nies et al. | 415/121.2 |
| 8,333,561 B2 * | 12/2012 | Baron | 416/17 |
| 2007/0222223 A1 * | 9/2007 | Bagepalli et al. | 290/55 |
| 2007/0243066 A1 * | 10/2007 | Baron | 416/132 B |
| 2010/0118492 A1 | 5/2010 | Larsen | |
| 2010/0143122 A1 * | 6/2010 | Nies et al. | 416/1 |
| 2011/0037267 A1 * | 2/2011 | Kestermann et al. | 290/55 |
| 2011/0272949 A1 * | 11/2011 | Matsuo et al. | 290/55 |
| 2012/0025541 A1 * | 2/2012 | Hirai et al. | 290/55 |
| 2012/0032448 A1 * | 2/2012 | Sato et al. | 290/1 B |
| 2012/0034861 A1 * | 2/2012 | Skrobek | 454/239 |
| 2012/0074711 A1 * | 3/2012 | Sato et al. | 290/55 |
| 2012/0101644 A1 * | 4/2012 | Evans et al. | 700/287 |
| 2012/0124984 A1 * | 5/2012 | Akashi et al. | 60/398 |
| 2012/0299307 A1 * | 11/2012 | Sato et al. | 290/1 B |
| 2012/0322356 A1 * | 12/2012 | Fujishiro et al. | 454/269 |
| 2013/0009405 A1 * | 1/2013 | Sato et al. | 290/55 |

FOREIGN PATENT DOCUMENTS

| | | |
|---|---|---|
| JP | 2000-18675 A | 1/2000 |
| JP | 2005-106323 A | 4/2005 |
| JP | 2008-121916 A | 5/2008 |
| JP | 2008-286115 A | 11/2008 |

* cited by examiner

WIND TURBINE FOR WIND POWER GENERATION

RELATED APPLICATIONS

The present application is a National Phase of International Application Number PCT/JP2010/064184, filed Aug. 23, 2010, and claims priority from Japanese Application Number 2009-198262.

TECHNICAL FIELD

The present invention relates to wind turbines for wind power generation.

BACKGROUND ART

As a wind turbine for wind power generation, for example, the one disclosed in Patent Literature 1 is known.

CITATION LIST

Patent Literature
Japanese Unexamined Patent Application, Publication No. HEI-05-079450

SUMMARY OF INVENTION

Technical Problem

Wind turbines for wind power generation accommodate heat-generating devices such as a drive train, a generator, and a control unit, and some wind turbines have a fan and filter for cooling such heat-generating devices with air. The filter removes impurities such as dust, rainwater, snow drops, and salt particles from outside air taken into the wind turbine for wind power generation, and if the filter becomes clogged with such impurities, it may be impossible to properly cool the heat-generating devices.

Therefore, currently, the filter is inspected regularly (at predetermined intervals), and the filter is replaced or washed (cleaned) if the filter becomes clogged or almost clogged.

However, it is difficult to predict when the filter becomes clogged in advance because the clogging of the filter depends greatly on the site where the wind turbine for wind power generation is installed (such as an inland area, a coastal area, or ocean) and the surrounding environment where the wind turbine for wind power generation is installed (such as air cleanliness, wind speed, and atmospheric temperature). Consequently, even if the filter is regularly inspected, the filter may be completely clogged or may be hardly clogged at all.

An object of the present invention, which has been made in light of the above circumstances, is to provide a wind turbine for wind power generation that allows clogging of a filter to be accurately detected so that a heat-generating device accommodated in the wind turbine for wind power generation can always be properly cooled.

Solution to Problem

To solve the above problem, the present invention employs the following solutions.

A wind turbine for wind power generation according to the present invention accommodates a heat-generating device and includes a column disposed in an upright position on a foundation, a nacelle disposed on a top end of the column, and a rotor head supported by the nacelle so as to be rotatable about a substantially horizontal axis, and the wind turbine includes an intake which is provided in an outer surface of the wind turbine and through which outside air is taken into the wind turbine to cool the heat-generating device; an exhaust which is provided in the outer surface of the wind turbine and through which air inside the wind turbine is discharged outside the wind turbine; an impurity-removing mechanism disposed in a flow path of air from the intake to the exhaust to remove impurities contained in the outside air; and a control unit for determining the condition of the impurity-removing mechanism by comparing, as a parameter serving as a criterion for determining the condition of the impurity-removing mechanism, latest data obtained while a wind speed outside the wind turbine is substantially stable with reference value data input in advance.

More preferably, in the above wind turbine for wind power generation, the impurity-removing mechanism is a filter and, as the condition thereof, it is determined whether the filter is clogged with accumulated impurities.

More preferably, the above wind turbine for wind power generation further includes a fan disposed in a path from the filter to the exhaust to forcedly facilitate the intake of outside air.

More preferably, in the above wind turbine for wind power generation, the reference value data used is a period of time set as an operating time expected to be required until the interior temperature of the wind turbine is decreased by a predetermined temperature from an interior temperature of the wind turbine immediately before the fan is continuously operated by continuously operating the fan if the filter is clogged or is almost clogged, and the latest data used is an actual operating time required until the interior temperature of the wind turbine is decreased by the predetermined temperature from the interior temperature of the wind turbine immediately before the fan is continuously operated by continuously operating the fan.

More preferably, in the above wind turbine for wind power generation, the reference value data used is a temperature change expected to be obtained after the fan is continuously operated for a predetermined period of time if the filter is clogged or is almost clogged, the temperature change being set as a difference between an interior temperature of the wind turbine immediately before the fan is continuously operated for the predetermined period of time and an interior temperature of the wind turbine immediately after the fan is continuously operated for the predetermined period of time, and the latest data used is an actual temperature change obtained as an actual difference between the interior temperature of the wind turbine immediately before the fan is continuously operated for the predetermined period of time and the interior temperature of the wind turbine immediately after the fan is continuously operated for the predetermined period of time.

More preferably, the above wind turbine for wind power generation further includes an anemometer disposed near a downstream side of the filter or in the flow path of air in the wind turbine, the reference value data used is a wind speed set as a wind speed expected to be measured if the filter is clogged or is almost clogged, and the latest data used is an actual wind speed obtained with the anemometer by continuously operating the fan.

More preferably, the above wind turbine for wind power generation further includes a differential pressure gauge for measuring a difference between a pressure near an upstream side of the filter and a pressure near a downstream side of the filter or a differential pressure gauge for measuring a difference between a pressure on an upstream side of the flow path of air in the wind turbine and a pressure on a downstream side of the flow path of air in the wind turbine, the reference value data used is a pressure difference set as a pressure difference expected to be measured if the filter is clogged or is almost clogged, and the latest data used is an actual pressure difference obtained with the differential pressure gauge by continuously operating the fan.

Such a wind turbine for wind power generation allows clogging of the filter to be accurately detected so that the heat-generating device accommodated in the wind turbine can always be properly cooled.

More preferably, the above wind turbine for wind power generation is set so as to obtain the latest data at a wind speed below a cut-in wind speed.

Because such a wind turbine for wind power generation obtains data at a wind speed at which power generation is not performed, that is, below the cut-in wind speed, it avoids a decrease in power generation efficiency, thus allowing a generator to operate to the maximum extent possible.

More preferably, the above wind turbine for wind power generation is set so as to obtain the latest data at nighttime, when there is no effect of sunlight, and/or at a time of day when the atmospheric temperature varies little and is stable.

Such a wind turbine for wind power generation eliminates the effect of sunlight and the effect of varying atmospheric temperature to collect more accurate data, thus allowing clogging of the filter to be more accurately detected.

A wind turbine for wind power generation according to the present invention accommodates a heat-generating device and includes a column disposed in an upright position on a foundation, a nacelle disposed on a top end of the column, and a rotor head supported by the nacelle so as to be rotatable about a substantially horizontal axis, and the wind turbine includes an intake which is provided in an outer surface of the wind turbine and through which outside air is taken into the wind turbine to cool the heat-generating device; an exhaust which is provided in the outer surface of the wind turbine and through which air inside the wind turbine is discharged outside the wind turbine; an impurity-removing mechanism disposed in a flow path of air from the intake to the exhaust to remove impurities contained in the outside air; a fan disposed in a path from the impurity-removing mechanism to the exhaust to facilitate the intake of the outside air; and a control unit for determining that the impurity-removing mechanism is clogged or is almost clogged if the duty ratio of the fan exceeds a threshold set in advance.

The wind turbines for wind power generation according to the present invention allow clogging of the filter to be accurately detected so that heat-generating devices accommodated in the wind turbines can always be properly cooled.

Advantageous Effects of Invention

The wind turbines for wind power generation according to the present invention provides the advantageous effect of allowing clogging of the filter to be accurately detected so that heat-generating devices accommodated in the wind turbines can always be properly cooled.

DESCRIPTION OF EMBODIMENTS

A first embodiment of a wind turbine for wind power generation according to the present invention will be described below with reference to FIGS. 1 to 3.

Figure 1:
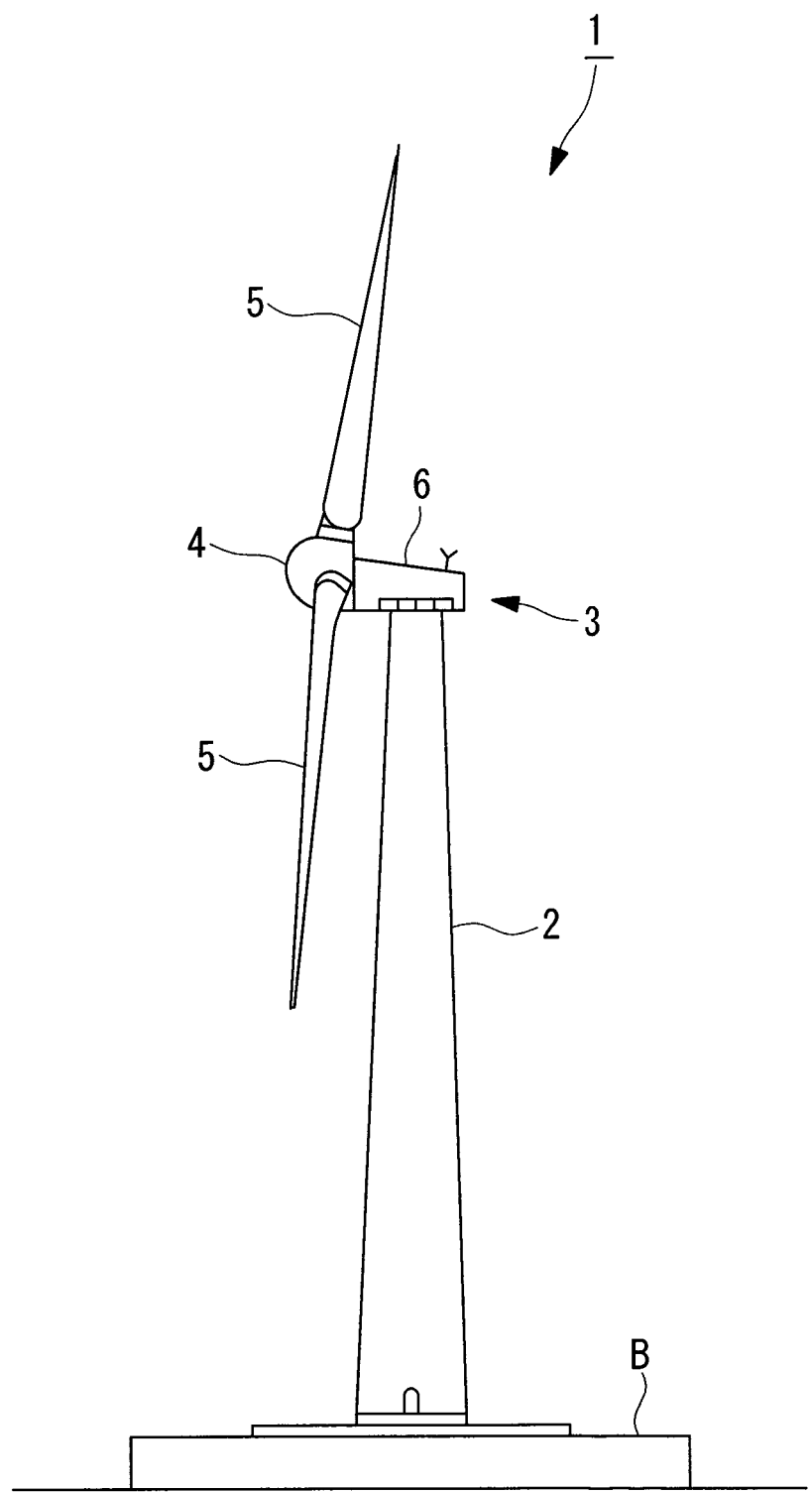
FIG. 1 is a side view showing a wind turbine for wind power generation according to a first embodiment of the present invention.
Figure 2:
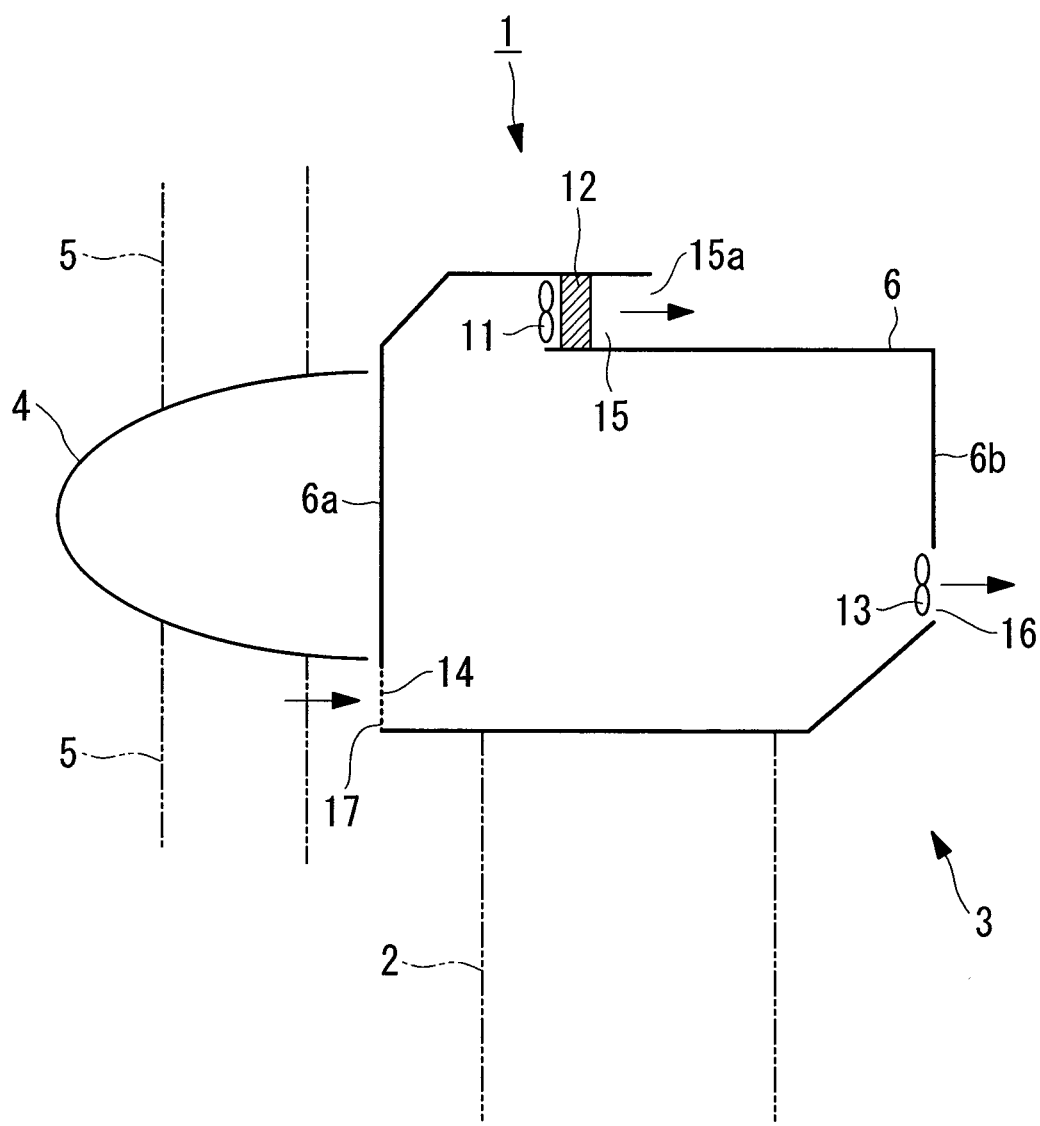
FIG. 2 is a sectional view showing the interior of a nacelle shown in FIG. 1 in simplified view.
Figure 3:
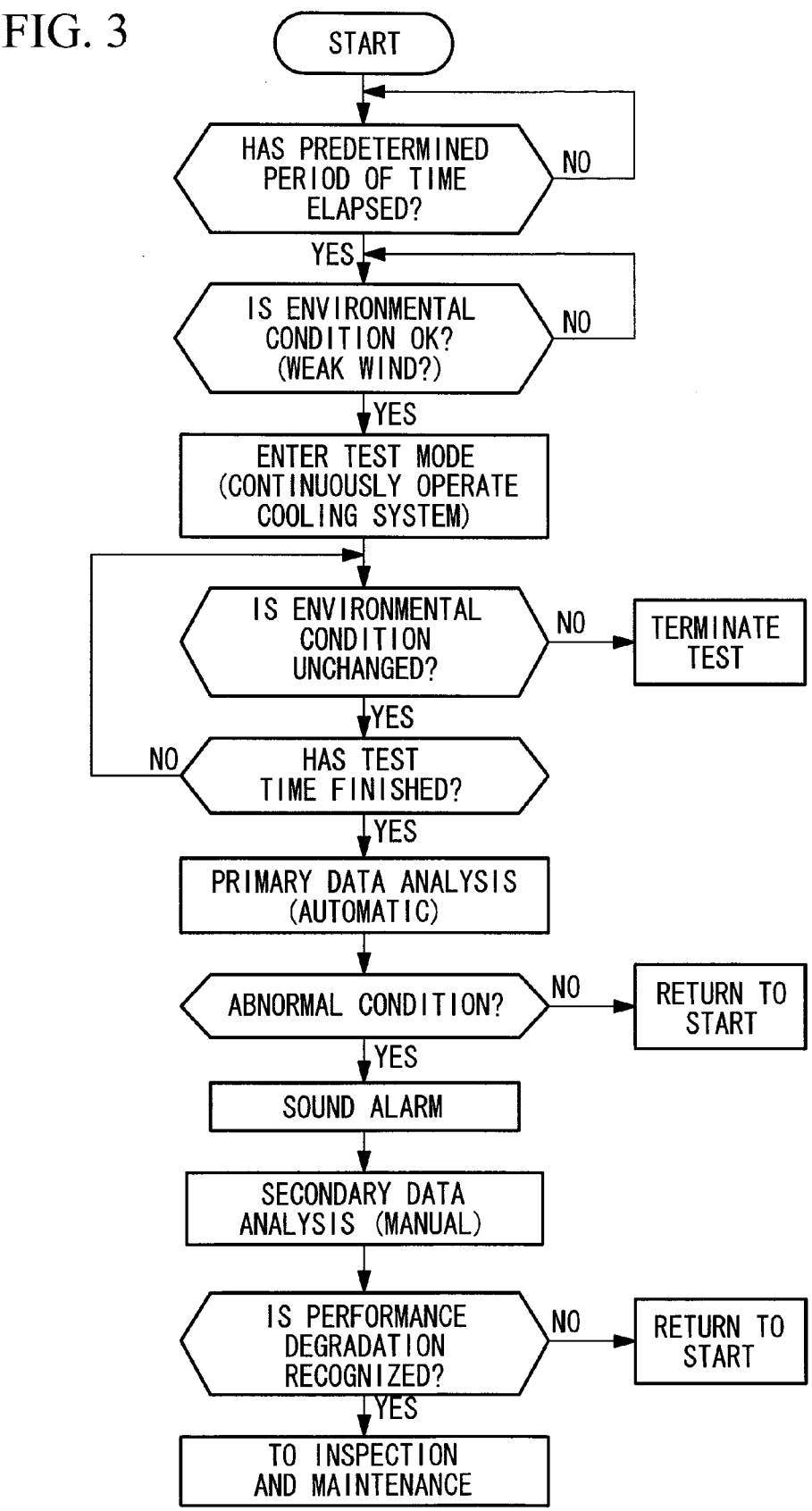
FIG. 3 is a flowchart illustrating the operation of a control unit included in the wind turbine for wind power generation according to the present invention.

FIG. 1 is a side view showing the wind turbine for wind power generation according to this embodiment, FIG. 2 is a sectional view showing the interior of a nacelle shown in FIG. 1 in simplified view, and FIG. 3 is a flowchart illustrating the operation of a control unit included in the wind turbine for wind power generation according to the present invention.

For simplification of the drawings, FIG. 3 shows only elements relating directly to the present invention.

As shown in FIG. 1, a wind turbine 1 for wind power generation includes a column (also referred to as "tower") 2 disposed in an upright position on a foundation B, a nacelle 3 disposed on the top end of the column 2, and a rotor head 4 disposed on the nacelle 3 so as to be rotatable about a substantially horizontal axis.

The rotor head 4 has a plurality of (for example, three) wind turbine rotating blades 5 attached thereto in a radiating pattern around the rotation axis thereof. This allows the force of wind striking the wind turbine rotating blades 5 in the rotation axis direction of the rotor head 4 to be converted into power rotating the rotor head 4 about the rotation axis direction thereof.

The column 2 is constituted of a plurality of (for example, three) units (not shown) coupled vertically.

The nacelle 3 is installed on the topmost unit of the units constituting the column 2 and includes a nacelle base (not shown) attached to the top end of the column 2 and a cover 6 covering the top of the nacelle base.

As shown in FIG. 2, a (first) exhaust fan 11, a lubricant oil cooler (heat exchanger) 12, a (second) exhaust fan 13, and a filter 14 are provided in the nacelle 3.

The exhaust fan 11 and the lubricant oil cooler 12 are provided on top of the cover 6 and are provided in an exhaust channel 15 that opens toward a rear surface (surface opposite a front surface 6a facing the rotor head 4) 6b of the nacelle 3 so that air inside the nacelle 3, blown by the exhaust fan 11, is subjected to heat exchange by the lubricant oil cooler 12 (removes heat from lubricant oil passing through the lubricant oil cooler 12) and is then discharged outside the nacelle 3 through an exit ((first) exhaust) 15a of the exhaust channel 15.

Lubricant oil heated after being supplied to a gearbox (not shown) for transmitting rotation of a rotating shaft (not shown) connected (coupled) to the rotor head 4 to a generator (not shown), a bearing (not shown) for supporting the rotating shaft connected (coupled) to the rotor head 4, etc. (having removed heat from the gearbox, the bearing, etc.) passes through the lubricant oil cooler 12. The lubricant oil cooled by the lubricant oil cooler 12 (from which heat has been removed by the air inside the nacelle 3 blown by the exhaust fan 11) is supplied again (returned) to the gearbox, the bearing, etc. to cool the gearbox, the bearing, etc.

The exhaust fan 13 is provided near the upstream side of a (second) exhaust 16 that opens in the rear surface 6b of the cover 6 so that air inside the nacelle 3, blown by the exhaust fan 13, is discharged outside the nacelle 3 through the exhaust 16.

The filter 14 removes impurities such as dust, rainwater, snow drops, and salt particles from outside air taken into the nacelle 3 (air outside the nacelle 3) and is provided near the downstream side of an intake 17 that opens at the bottom end of the front surface 6a. Outside air flows into the nacelle 3 through the intake 17 and the filter 14 so as to compensate for the air inside the nacelle 3 discharged through the exhausts 15a and 16 so that the outside air taken into the nacelle 3 through the intake 17 and the filter 14 cools heat-generating devices (not shown) (such as a drive train, a generator, and a control unit) disposed (accommodated) in the nacelle 3.

The control unit disposed in the nacelle 3 monitors clogging of the filter 14 (monitoring) according to the flowchart shown in FIG. 3.

Specifically, it is determined whether or not a predetermined period of time (for example, two weeks or one month) has elapsed after the completion of the last monitoring (measurement), and if the predetermined period of time has elapsed, the next step is reached, where it is determined whether or not an environmental condition is satisfied, in other words, whether or not the wind speed outside the nacelle 3 is weak (a wind speed (for example, 1 m/s) below a cut-in wind speed (wind speed at which power generation is started (for example, 3 m/s)), and if the environmental condition is satisfied, the next step is reached. On the other hand, if the environmental condition is not satisfied, the next step is reached after the environmental condition is satisfied.

If the environmental condition is satisfied (ready), a test mode is entered, where the cooling system disposed in the nacelle 3, that is, the exhaust fans 11 and 13, is continuously operated.

In the test mode, power generation is stopped, and the rotor head 4, the wind turbine rotating blades 5, and the drive train are freely rotated by wind, with a parking brake being maintained in a free state.

During the test mode, it is sequentially determined whether or not the environmental condition is satisfied, and if the environmental condition is satisfied, the test mode is continued, where if a predetermined test time (for example, ten minutes) required for obtaining the necessary data has elapsed, the next step is reached. On the other hand, if the environmental condition is not satisfied during the test mode, that is, if the wind speed is equal to or more than the cut-in wind speed, the test mode is terminated, and power generation is started (resumed). The test mode is reentered after the environmental condition is satisfied.

In this embodiment, the parameters used as criteria for determining the condition of the filter 14 are the interior temperature of the nacelle 3 immediately before the cooling system is continuously operated and the operating time required until the interior temperature of the nacelle 3 is decreased by a predetermined temperature (for example, 5° C.) from the interior temperature of the nacelle 3 immediately before the cooling system is continuously operated, and this data is accumulated (stored) in the control unit.

After the test mode is finished, a primary data analysis mode is entered. In this primary data analysis mode, the control unit compares the latest data newly obtained this time with the reference value data input to (stored in) the control unit in advance and serving as a reference, and if the control unit determines that "there is an abnormal condition," that is, the filter 14 is clogged or is almost clogged, the control unit sounds an alarm (warning sound). On the other hand, if the control unit determines that "there is no abnormal condition," that is, the filter 14 is not clogged or is not almost clogged, the control unit starts newly counting the predetermined period of time (predetermined period of time until the start of the next monitoring (measurement)).

In this embodiment, the comparison of the latest data newly obtained this time with the reference value data is performed by comparing the operating time newly obtained this time (that is, the actual operating time required until the interior temperature of the nacelle 3 is decreased by a predetermined temperature (for example, 5° C.) from the interior temperature of the nacelle 3 immediately before the cooling system is continuously operated by continuously operating the cooling system) with the reference operating time input to (stored in) the control unit in advance (that is, a period of time set (assumed) as the operating time expected to be required until the interior temperature of the nacelle 3 is decreased by the predetermined temperature from the interior temperature of the nacelle 3 immediately before the cooling system is continuously operated by continuously operating the cooling system if the filter 14 is clogged or is almost clogged), and the control unit determines that "there is an abnormal condition" if the operating time newly obtained this time exceeds the reference operating time and determines that "there is no abnormal condition" if the operating time newly obtained this time does not exceed the reference operating time.

If the control unit determines that "there is an abnormal condition," it sounds an alarm and transmits (sends) the latest data to a control room (not shown) where there is an operator, and the operator then performs secondary data analysis. As a result of the secondary data analysis by the operator, if the operator determines that the filter 14 is clogged or is almost clogged, that is, if the operator recognizes a degradation in the performance of the filter 14, the filter 14 is inspected and maintained; if the operator determines that the filter 14 is not clogged or is not almost clogged, that is, if the operator recognizes no degradation in the performance of the filter 14, the determination result is transmitted (sent) from the control room to the control unit of the wind turbine 1 for wind power generation, and the control unit starts newly counting the predetermined period of time (predetermined period of time until the start of the next monitoring (measurement)).

The wind turbine 1 for wind power generation according to this embodiment allows clogging of the filter 14 to be accurately detected so that the heat-generating devices accommodated in the nacelle 3 can always be properly cooled.

Because the wind turbine 1 for wind power generation according to this embodiment obtains data at a wind speed at which power generation is not performed, that is, below the cut-in wind speed, it avoids a decrease in power generation efficiency, thus allowing the generator to operate to the maximum extent possible.

A second embodiment of a wind turbine for wind power generation according to the present invention will now be described with reference to FIG. 4.

Figure 4:
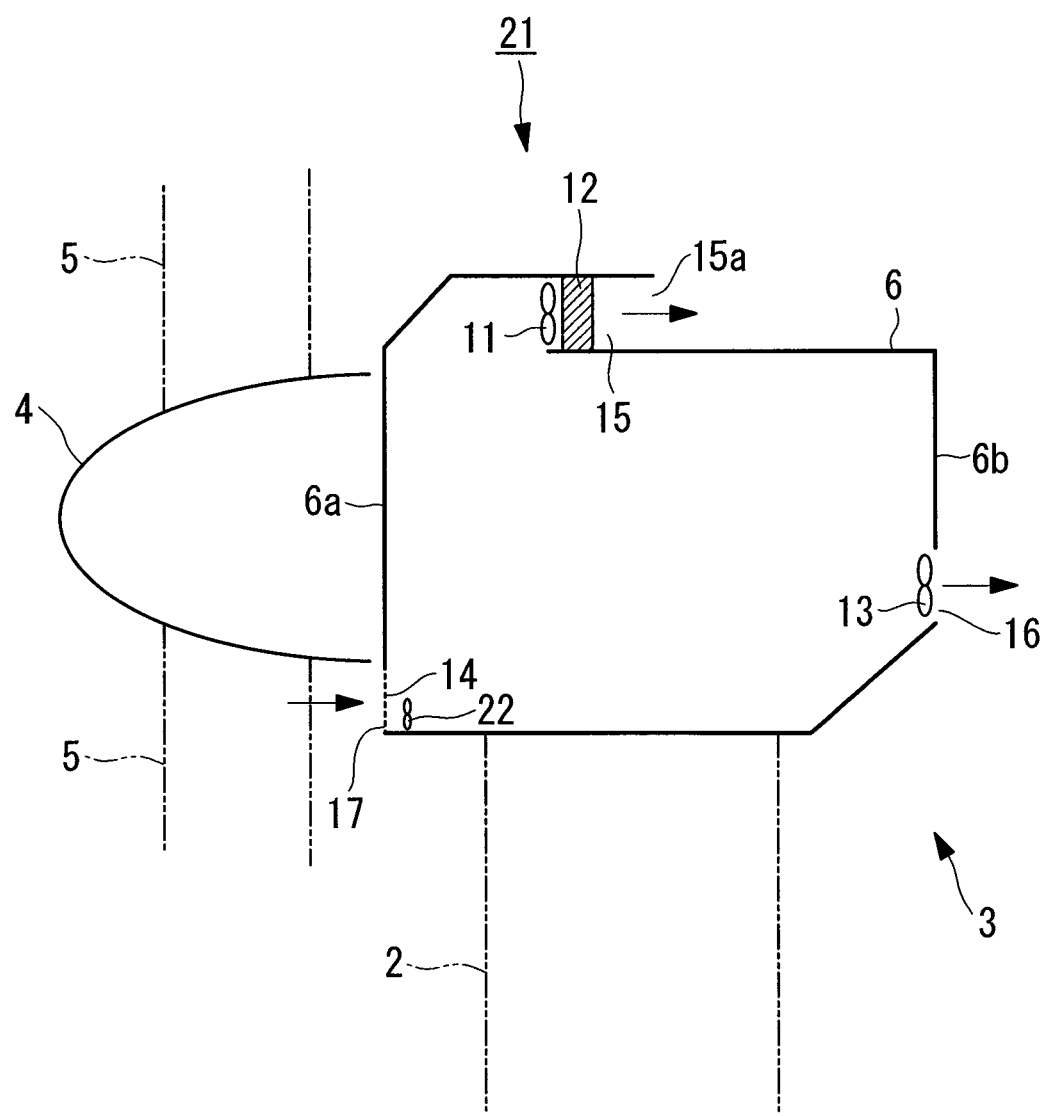
FIG. 4 is a sectional view showing the interior of a nacelle of a wind turbine for wind power generation according to a second embodiment of the present invention in simplified view.

FIG. 4 is a sectional view showing the interior of a nacelle of the wind turbine for wind power generation according to this embodiment in simplified view.

A wind turbine 21 for wind power generation according to this embodiment differs from that of the first embodiment described above in that an anemometer 22 is provided near the downstream side of the filter 14. A description of other elements will be omitted here because these elements are the same as those of the first embodiment described above.

The same members as in the embodiment described above are denoted by the same reference signs.

As shown in FIG. 4, in this embodiment, the anemometer 22 is provided near the downstream side of the filter 14, and the anemometer 22 measures (determines) the wind speed (flow velocity: volume of air) of the outside air (air outside the nacelle 3) flowing into the nacelle 3 through the filter 14.

In this embodiment, instead of measuring the interior temperature of the nacelle 3 immediately before the cooling system is continuously operated and the operating time required until the interior temperature of the nacelle 3 is decreased by a predetermined temperature (for example, 5° C.) from the interior temperature of the nacelle 3 immediately before the cooling system is continuously operated, the anemometer 22 measures the wind speed of the outside air flowing into the nacelle 3 through the filter 14.

Specifically, the control unit according to this embodiment determines whether or not a predetermined period of time (for example, two weeks or one month) has elapsed after the completion of the last monitoring (measurement), and if the predetermined period of time has elapsed, the next step is reached, where the control unit determines whether or not an environmental condition is satisfied, in other words, whether or not the wind speed is weak (a wind speed (for example, 1 m/s) below a cut-in wind speed (wind speed at which power generation is started), and if the environmental condition is satisfied, the next step is reached. On the other hand, if the environmental condition is not satisfied, the next step is reached after the environmental condition is satisfied.

If the environmental condition is satisfied (ready), a test mode is entered, where the cooling system disposed in the nacelle 3, that is, the exhaust fans 11 and 13, is continuously operated.

In the test mode, power generation is stopped, and the rotor head 4, the wind turbine rotating blades 5, and the drive train are freely rotated by wind, with the parking brake being maintained in a free state. At this time, the data measured by the anemometer 22 is sequentially output (transmitted) to the control unit.

During the test mode, it is sequentially determined whether or not the environmental condition is satisfied, and if the environmental condition is satisfied, the test mode is continued, where if a predetermined test time (for example, ten minutes) required for obtaining the necessary data has elapsed, the next step is reached. On the other hand, if the environmental condition is not satisfied during the test mode, that is, if the wind speed is equal to or more than the cut-in wind speed, the test mode is terminated, and power generation is started (resumed). The test mode is reentered after the environmental condition is satisfied.

The necessary data in this embodiment refers to the wind speed measured by the anemometer 22, and this data is accumulated (stored) in the control unit.

After the test mode is finished, a primary data analysis mode is entered. In this primary data analysis mode, the control unit compares the latest data newly obtained this time with the reference value data input to (stored in) the control unit in advance and serving as a reference, and if the control unit determines that "there is an abnormal condition," that is, the filter 14 is clogged or is almost clogged, the control unit sounds an alarm (warning sound). On the other hand, if the control unit determines that "there is no abnormal condition," that is, the filter 14 is not clogged or is not almost clogged, the control unit starts newly counting the predetermined period of time (predetermined period of time until the start of the next monitoring (measurement)).

In this embodiment, the comparison of the latest data newly obtained this time with the reference value data is performed by comparing the wind speed newly obtained this time with the anemometer 22 by continuously operating the cooling system with the reference wind speed input to (stored in) the control unit in advance (that is, a wind speed set (assumed) as the wind speed expected to be measured if the filter 14 is clogged or is almost clogged), and the control unit determines that "there is an abnormal condition" if the wind speed newly obtained this time is equal to or less than the reference wind speed and determines that "there is no abnormal condition" if the wind speed newly obtained this time exceeds the reference wind speed.

If the control unit determines that "there is an abnormal condition," it sounds an alarm and transmits (sends) the latest data to a control room (not shown) where there is an operator, and the operator then performs secondary data analysis. As a result of the secondary data analysis by the operator, if the operator determines that the filter 14 is clogged or is almost clogged, that is, if the operator recognizes a degradation in the performance of the filter 14, the filter 14 is inspected and maintained; if the operator determines that the filter 14 is not clogged or is not almost clogged, that is, if the operator recognizes no degradation in the performance of the filter 14, the determination result is transmitted (sent) from the control room to the control unit of the wind turbine 21 for wind power generation, and the control unit starts newly counting the predetermined period of time (predetermined period of time until the start of the next monitoring (measurement)).

The wind turbine 21 for wind power generation according to this embodiment allows clogging of the filter 14 to be accurately detected so that the heat-generating devices accommodated in the nacelle 3 can always be properly cooled.

Because the wind turbine 21 for wind power generation according to this embodiment obtains data at a wind speed at which power generation is not performed, that is, below the cut-in wind speed, it avoids a decrease in power generation efficiency, thus allowing the generator to operate to the maximum extent possible.

A third embodiment of a wind turbine for wind power generation according to the present invention will now be described with reference to FIG. 5.

Figure 5:
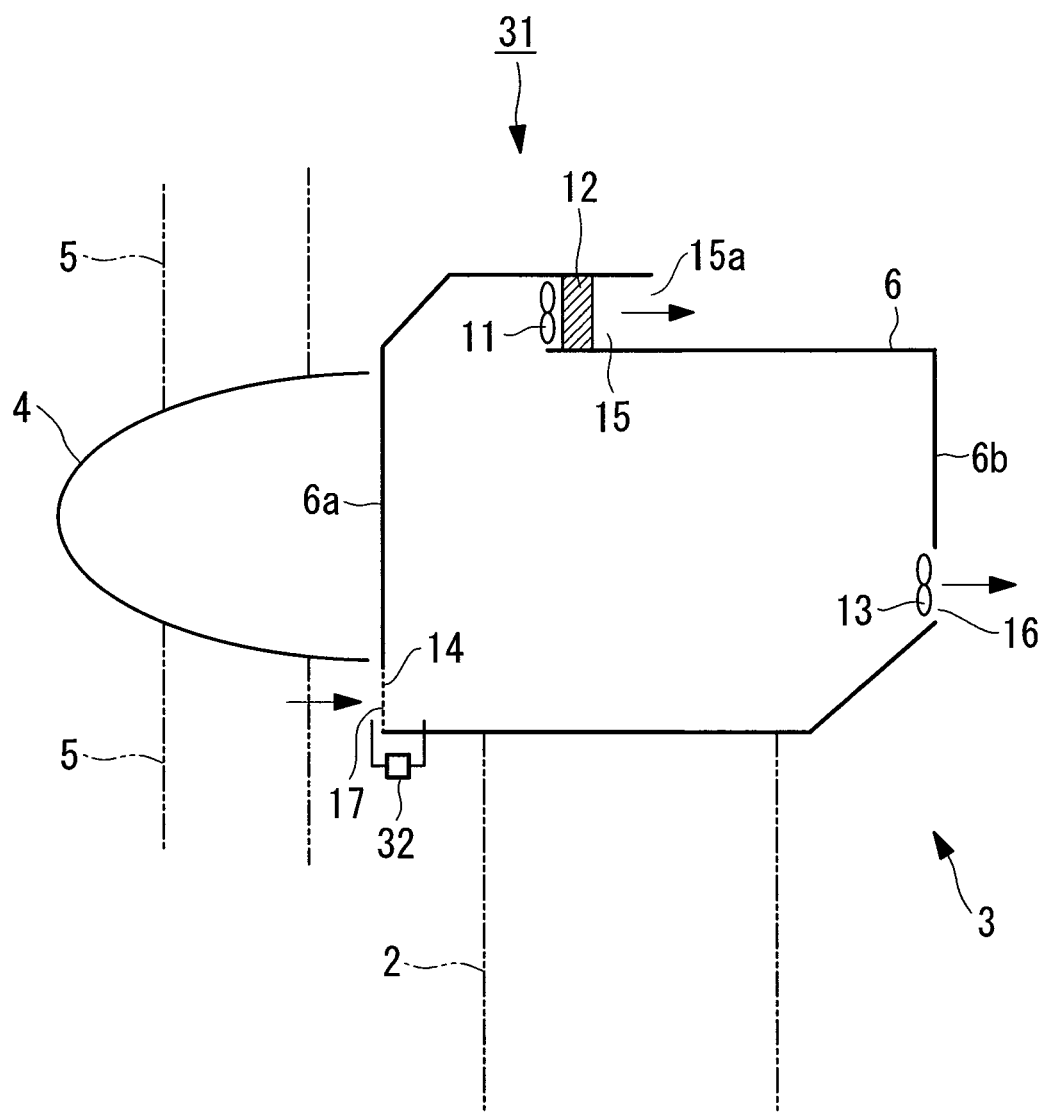
FIG. 5 is a sectional view showing the interior of a nacelle of a wind turbine for wind power generation according to a third embodiment of the present invention in simplified view.

FIG. 5 is a sectional view showing the interior of a nacelle of the wind turbine for wind power generation according to this embodiment in simplified view.

A wind turbine 31 for wind power generation according to this embodiment differs from that of the first embodiment described above in that a differential pressure gauge 32 is provided for measuring (determining) the difference between the pressure (static or dynamic pressure) near the upstream side of the filter 14 and the pressure (static or dynamic pressure) near the downstream side of the filter 14 (that is, the pressure difference between the front and rear sides of the filter 14). A description of other elements will be omitted here because these elements are the same as those of the first embodiment described above.

The same members as in the embodiment described above are denoted by the same reference signs.

As shown in FIG. 5, in this embodiment, the differential pressure gauge 32 is provided for measuring the difference between the pressure near the upstream side of the filter 14 and the pressure near the downstream side of the filter 14, and the differential pressure gauge 32 measures (determines) the wind pressure difference (pressure differential or volume of air) of the outside air (air outside the nacelle 3) passing through the filter 14.

In this embodiment, instead of measuring the interior temperature of the nacelle 3 immediately before the cooling system is continuously operated and the operating time required until the interior temperature of the nacelle 3 is decreased by a predetermined temperature (for example, 5° C.) from the interior temperature of the nacelle 3 immediately before the cooling system is continuously operated, the differential pressure gauge 32 measures the wind pressure difference between the front and rear sides of the filter 14.

Specifically, the control unit according to this embodiment determines whether or not a predetermined period of time (for example, two weeks or one month) has elapsed after the completion of the last monitoring (measurement), and if the predetermined period of time has elapsed, the next step is reached, where the control unit determines whether or not an environmental condition is satisfied, in other words, whether or not the wind speed is weak (a wind speed (for example, 1 m/s) below a cut-in wind speed (wind speed at which power generation is started), and if the environmental condition is satisfied, the next step is reached. On the other hand, if the environmental condition is not satisfied, the next step is not reached before the environmental condition is satisfied; that is, the control unit waits for the environmental condition to be satisfied.

If the environmental condition is satisfied (ready), a test mode is entered, where the cooling system disposed in the nacelle 3, that is, the exhaust fans 11 and 13, is continuously operated.

In the test mode, power generation is stopped, and the rotor head 4, the wind turbine rotating blades 5, and the drive train are freely rotated by wind, with the parking brake being maintained in a free state. At this time, the data measured by the differential pressure gauge 32 is sequentially output (transmitted) to the control unit.

During the test mode, it is sequentially determined whether or not the environmental condition is satisfied, and if the environmental condition is satisfied, the test mode is continued, where if a predetermined test time (for example, ten minutes) required for obtaining the necessary data has elapsed, the next step is reached. On the other hand, if the environmental condition is not satisfied during the test mode, that is, if the wind speed is equal to or more than the cut-in wind speed, the test mode is terminated, and power generation is started (resumed). The test mode is reentered after the environmental condition is satisfied.

The necessary data in this embodiment refers to the pressure difference between the front and rear sides of the filter 14 measured by the differential pressure gauge 32, and this data is accumulated (stored) in the control unit.

After the test mode is finished, a primary data analysis mode is entered. In this primary data analysis mode, the control unit compares the latest data newly obtained this time with the reference value data input to (stored in) the control unit in advance and serving as a reference, and if the control unit determines that "there is an abnormal condition," that is, the filter 14 is clogged or is almost clogged, the control unit sounds an alarm (warning sound). On the other hand, if the control unit determines that "there is no abnormal condition," that is, the filter 14 is not clogged or is not almost clogged, the control unit starts newly counting the predetermined period of time (predetermined period of time until the start of the next monitoring (measurement)).

In this embodiment, the comparison of the latest data newly obtained this time with the reference value data is performed by comparing the wind pressure difference newly obtained this time with the reference wind pressure difference input to (stored in) the control unit in advance (that is, a wind pressure difference set (assumed) as the wind pressure difference expected to be measured if the filter 14 is clogged or is almost clogged), and the control unit determines that "there is an abnormal condition" if the wind pressure difference newly obtained this time exceeds the reference pressure difference and determines that "there is no abnormal condition" if the pressure difference newly obtained this time does not exceed the reference pressure difference.

If the control unit determines that "there is an abnormal condition," it sounds an alarm and transmits (sends) the latest data to a control room (not shown) where there is an operator, and the operator then performs secondary data analysis. As a result of the secondary data analysis by the operator, if the operator determines that the filter 14 is clogged or is almost clogged, that is, if the operator recognizes a degradation in the performance of the filter 14, the filter 14 is inspected and maintained; if the operator determines that the filter 14 is not clogged or is not almost clogged, that is, if the operator recognizes no degradation in the performance of the filter 14, the determination result is transmitted (sent) from the control room to the control unit of the wind turbine for wind power generation, and the control unit starts newly counting the predetermined period of time (predetermined period of time until the start of the next monitoring (measurement)).

The wind turbine 31 for wind power generation according to this embodiment allows clogging of the filter 14 to be accurately detected so that the heat-generating devices accommodated in the nacelle 3 can always be properly cooled.

In addition, because the wind turbine 31 for wind power generation according to this embodiment obtains data at a wind speed at which power generation is not performed, that is, below the cut-in wind speed, it avoids a decrease in power generation efficiency, thus allowing the generator to operate to the maximum extent possible.

To the environmental conditions in the embodiments described above, it is more preferable to add the condition that the environment is limited to nighttime, when there is no effect of sunlight, and/or the condition that the environment is limited to times of day when the atmospheric temperature varies little and is stable.

This eliminates the effect of sunlight and the effect of varying atmospheric temperature and therefore allows more accurate data to be collected, so that it can be more accurately determined when the filter 14 needs inspection and maintenance.

The present invention is not limited to the embodiments described above; modifications and changes are permitted as needed without departing from the technical idea of the present invention.

For example, it is possible to combine the first and second embodiments described above, to combine the first and third embodiments, to combine the second and third embodiments, or to combine the first, second, and third embodiments.

This allows more data to be collected and used to determine whether the filter 14 is clogged, so that it can be more accurately determined when the filter 14 needs inspection and maintenance.

In addition to the embodiments described above, it is also possible to determine whether the filter 14 is clogged on the basis of the duty ratio of the cooling system being always monitored (monitoring), that is, the duty ratio of the exhaust fans 11 and 13. In general, the exhaust fans 11 and 13 are set so as to operate if the interior temperature of the nacelle is at or above a predetermined value and to stop if the interior temperature of the nacelle is at or below the predetermined value. That is, if the duty ratio exceeds a threshold set (assumed) in advance, indicating that the interior temperature of the nacelle continues to be at or above the predetermined value, it is possible to determine that "there is an abnormal condition," that is, the filter 14 is clogged or is almost clogged; if the duty ratio does not exceed the threshold set (assumed) in advance, it is possible to determine that "there is no abnormal condition," that is, the filter 14 is not clogged or is not almost clogged.

This technique is most advantageous in terms of cost because there is no need to add, for example, a sensor for measuring (determining) the duty ratio.

Although the system is configured such that the test mode is entered if the wind speed is weak in the embodiments described above, the system can be configured such that the test mode is entered at or above the cut-in wind speed if the wind speed is substantially stable (substantially constant).

For a wind farm where a plurality of wind turbines for wind power generation are installed, at least one of the wind turbines for wind power generation may be monitored for clogging of the filter 14, and the result thereof may be reflected in the other wind turbines for wind power generation; it is unnecessary to monitor all wind turbines for wind power generation for clogging of the filter 14.

Although the primary data analysis is performed by the control unit accommodated in the nacelle 3 in the embodiments described above, it is also possible to install the control unit in a control room where there is an operator to perform the primary data analysis on the basis of data transmitted to the control unit from the sensors disposed in the nacelle 3 (such as the temperature sensor (not shown), the anemometer 22, and the differential pressure gauge 32).

Although the interior temperature of the nacelle 3 immediately before the cooling system is continuously operated and the operating time required until the interior temperature of the nacelle 3 is decreased by a predetermined temperature (for example, 5° C.) from the interior temperature of the nacelle 3 immediately before the cooling system is continuously operated are measured in the first embodiment described above, it is instead possible to use a temperature change obtained as the difference between the interior temperature of the nacelle 3 immediately before the cooling system is continuously operated for a predetermined period of time and the interior temperature of the nacelle 3 immediately after the cooling system is continuously operated for the predetermined period of time.

Although the anemometer 22 is provided near the downstream side of the filter 14 in the second embodiment described above, the present invention is not limited thereto; it may be provided at any site in the flow path of air in the nacelle 3 where the flow velocity of the air passing along the flow path can be measured.

Although the differential pressure gauge 32 is provided for measuring the difference between the pressure near the upstream side of the filter 14 and the pressure near the downstream side of the filter 14 in the third embodiment described above, the present invention is not limited thereto; it is also possible to provide a differential pressure gauge in the flow path of air in the nacelle 3 to measure the difference between the pressure on the upstream side of the flow path and the pressure on the downstream side of the flow path.

The embodiments described above, all of which are intended to cool the heat-generating devices in the nacelle, are merely examples of preferred embodiments of the present invention; the present invention is not limited to the embodiments described above. For example, the present invention can also be applied to the case where the heat-generating devices are accommodated in a place other than the nacelle (for example, in the tower or in the rotor head).

REFERENCE SIGNS LIST

1 wind turbine for wind power generation
2 column
3 nacelle
4 rotor head
6 cover
11 exhaust fan
13 exhaust fan
14 filter
15a exhaust
16 exhaust
17 intake
21 wind turbine for wind power generation
22 anemometer
31 wind turbine for wind power generation
32 differential pressure gauge
B foundation

The invention claimed is:

1. A wind turbine for wind power generation accommodating a heat-generating device and comprising a column disposed in an upright position on a foundation, a nacelle disposed on a top end of the column, and a rotor head supported by the nacelle so as to be rotatable about a substantially horizontal axis, the wind turbine comprising:
   an intake which is provided in an outer surface of the wind turbine and through which outside air is taken into the wind turbine to cool the heat-generating device;
   an exhaust which is provided in the outer surface of the wind turbine and through which air inside the wind turbine is discharged outside the wind turbine;
   an impurity-removing mechanism disposed in a flow path of air from the intake to the exhaust to remove impurities contained in the outside air; and
   a control unit for determining the condition of the impurity-removing mechanism by comparing, as a parameter serving as a criterion for determining the condition of the impurity-removing mechanism, latest data obtained while a wind speed outside the wind turbine is substantially stable with reference value data input in advance.

2. The wind turbine for wind power generation according to claim 1, wherein the impurity-removing mechanism is a filter and, as the condition thereof, it is determined whether the filter is clogged with accumulated impurities.

3. The wind turbine for wind power generation according to claim 2, further comprising a fan disposed in a path from the filter to the exhaust to forcedly facilitate the intake of the outside air.

4. The wind turbine for wind power generation according to claim 3, wherein
   the reference value data used is a period of time set as an operating time expected to be required until the interior temperature of the wind turbine is decreased by a predetermined temperature from an interior temperature of the wind turbine immediately before the fan is continuously operated by continuously operating the fan if the filter is clogged or is almost clogged; and
   the latest data used is an actual operating time required until the interior temperature of the wind turbine is decreased by the predetermined temperature from the interior temperature of the wind turbine immediately before the fan is continuously operated by continuously operating the fan.

5. The wind turbine for wind power generation according to claim 3, wherein
   the reference value data used is a temperature change expected to be obtained after the fan is continuously operated for a predetermined period of time if the filter is clogged or is almost clogged, the temperature change being set as a difference between an interior temperature of the wind turbine immediately before the fan is continuously operated for the predetermined period of time and an interior temperature of the wind turbine immediately after the fan is continuously operated for the predetermined period of time; and the latest data used is an actual temperature change obtained as an actual difference between the interior temperature of the wind turbine immediately before the fan is continuously operated for the predetermined period of time and the interior temperature of the wind turbine immediately after the fan is continuously operated for the predetermined period of time.

6. The wind turbine for wind power generation according to claim 3, further comprising an anemometer disposed near a downstream side of the filter or in the flow path of air in the wind turbine, wherein the reference value data used is a wind speed set as a wind speed expected to be measured if the filter is clogged or is almost clogged; and the latest data used is an actual wind speed obtained with the anemometer by continuously operating the fan.

7. The wind turbine for wind power generation according to claim 3, further comprising a differential pressure gauge for measuring a difference between a pressure near an upstream side of the filter and a pressure near a downstream side of the filter or a differential pressure gauge for measuring a difference between a pressure on an upstream side of the flow path of air in the wind turbine and a pressure on a downstream side of the flow path of air in the wind turbine, wherein the reference value data used is a pressure difference set as a pressure difference expected to be measured if the filter is clogged or is almost clogged; and the latest data used is an actual pressure difference obtained with the differential pressure gauge by continuously operating the fan.

8. The wind turbine for wind power generation according to claim 1, wherein the wind turbine is set so as to obtain the latest data at a wind speed below a cut-in wind speed.

9. The wind turbine for wind power generation according to claim 1, wherein the wind turbine is set so as to obtain the latest data at nighttime, when there is no effect of sunlight, and/or at a time of day when the atmospheric temperature varies little and is stable.

10. A wind turbine for wind power generation accommodating a heat-generating device and comprising a column disposed in an upright position on a foundation, a nacelle disposed on a top end of the column, and a rotor head supported by the nacelle so as to be rotatable about a substantially horizontal axis, the wind turbine comprising:

an intake which is provided in an outer surface of the wind turbine and through which outside air is taken into the wind turbine to cool the heat-generating device;

an exhaust which is provided in the outer surface of the wind turbine and through which air inside the wind turbine is discharged outside the wind turbine;

an impurity-removing mechanism disposed in a flow path of air from the intake to the exhaust to remove impurities contained in the outside air;

a fan disposed in a path from the impurity-removing mechanism to the exhaust to facilitate the intake of the outside air; and a control unit for determining that the impurity-removing mechanism is clogged or is almost clogged if the duty ratio of the fan exceeds a threshold set in advance.

* * * * *